United States Patent [19]
Ito et al.

[11] Patent Number: 5,367,620
[45] Date of Patent: Nov. 22, 1994

[54] CHARACTER OUTPUT DEVICE

[75] Inventors: Yosuke Ito, Nagoya; Hiroshi Hattori, Inazawa; Fumihito Hayano, Nagoya, all of Japan

[73] Assignee: Brother Kogyo Kabushiki Kaisha, Aichi, Japan

[21] Appl. No.: 765,245

[22] Filed: Sep. 25, 1991

[30] Foreign Application Priority Data

Sep. 25, 1990 [JP] Japan .................. 2-254923
Mar. 22, 1991 [JP] Japan .................. 3-059101

[51] Int. Cl.⁵ .............................. G06F 15/62
[52] U.S. Cl. .................... 395/150; 395/151; 395/161; 395/164
[58] Field of Search ............ 395/150, 151, 164, 161; 382/46, 56

[56] References Cited

U.S. PATENT DOCUMENTS

| | | | |
|---|---|---|---|
| 4,785,391 | 11/1988 | Apley et al. | 395/150 |
| 4,907,282 | 3/1990 | Daly et al. | 395/150 |
| 4,916,746 | 4/1990 | Yeschick | 382/46 X |
| 4,953,033 | 8/1990 | Sakamoto | 358/300 |
| 4,959,801 | 9/1990 | Apley et al. | 395/150 |
| 4,992,954 | 2/1991 | Takeda et al. | 395/151 X |
| 5,027,304 | 6/1991 | Jeng et al. | 395/150 |
| 5,040,129 | 8/1991 | Nishiyama | 395/150 |
| 5,058,187 | 10/1991 | Kim | 382/56 X |
| 5,068,805 | 11/1991 | Tsuzuki | 395/164 |
| 5,099,435 | 3/1992 | Collins et al. | 395/150 X |
| 5,105,471 | 4/1992 | Yoshida et al. | 382/46 X |
| 5,109,433 | 4/1992 | Notenboom | 382/56 X |
| 5,123,061 | 6/1992 | Pritchard | 382/56 X |

FOREIGN PATENT DOCUMENTS 3011419 3/1991 Japan .

Primary Examiner—Heather R. Herndon
Assistant Examiner—Cliff N. Vo
Attorney, Agent, or Firm—Oliff & Berridge

[57] ABSTRACT

To reduce a memory area required to store bit-map data in a character output device in which bit-map data generated from outline data is stored for reuse. If font data corresponding to one character data read is from an input data RAM, then bit-map data is generated from the character data. If the vertical size of the bit-map data is 64 dots or longer than this, then the bit-map data is converted into run length data, which is stored in the font data RAM. If the vertical size of the bit-map data is less than 64 dots long, then the bit-map data is stored in the font data RAM.

25 Claims, 10 Drawing Sheets

FIG. 4(a)

|   | 0 | 1 | 2 | 3 | 4 |
|---|---|---|---|---|---|
| 0 | ● |   |   |   | ● |
| 1 | ● |   |   |   | ● |
| 2 | ● |   |   |   | ● |
| 3 | ● | ● | ● | ● | ● |
| 4 | ● |   |   |   | ● |
| 5 | ● |   |   |   | ● |
| 6 | ● |   |   |   | ● |

FIG. 4(b)

| | R1 | R2 | | |
|---|---|---|---|---|
| | 2 | 3 | | |
| R3 | 0 | 1 | 4 | 1 |
| R1 | 1 | 1 ~ R2 | | |
| R3 | 0 | 5 | | |
| R1 | 2 | 3 ~ R2 | | |
| R3 | 0 | 1 | 4 | 1 |

| | R1 | R2 | | |
|---|---|---|---|---|
| | 2 | 9 | | |
| R3 | 0 | 3 | 11 | 3 |
| R1 | 1 | 3 | R2 | |
| R3 | 0 | 14 | | |
| R1 | 2 | 8 | R2 | |
| R3 | 0 | 3 | 11 | 3 |

CHARACTER OUTPUT DEVICE

BACKGROUND OF THE INVENTION

1. Field of the Invention

The present invention relates to a character output device for converting character codes inputted from an external device into dot pattern data or bit-map data and outputting the characters to a printer, a display unit, or the like based on the bit-map data.

2. Description of the Prior Art

Conventional character output devices process outline data according to input data fed from an external device to generate bit-map data and output or print a character based on the generated bit-map data, wherein the input data contain character codes and information regarding character sizes and character styles. However, it is time-consuming to process the outline data into the bit-map data. To solve such a problem, there has been proposed a character output device in which bit-map data that have once been generated are stored in a given memory area for reuse, and the stored bit-map data are read and used again when the same input data is applied, thereby eliminating the time required to process the outline data, as disclosed in Japanese Laid-Open Patent Publications Nos. 63-116192 and 63-228195. The proposed process does not need to implement the conversion from the vector data into the bit-map data at all times and hence the time required before the characters are outputted is shortened.

However, the memory used to store the bit-map data is of a predetermined storage capacity. Therefore, there is a limitation on the amount of bit-map data that can be stored in the memory. One solution to this problem is to erase initially stored bit-map data when the amount of bit-map data to be stored exceeds the storage capacity of the memory, thus allowing new bit-map data to be stored in the memory.

Characters of large size have a very large amount of bit-map data, and hence a large memory area is required to store the bit-map data, particularly if the font size of the characters is large. When such large-size characters are stored in the memory, the number of characters that can be stored in the memory is greatly reduced, and the frequency of converting vector data into bit-map data is increased. As a result, the time required until the characters are outputted is increased even though the memory stores reusable bit-map data.

SUMMARY OF THE INVENTION

The present invention has been made in order to solve the above problems accompanying the conventional devices.

It is an object of the present invention to provide a character output device which compresses bit-map data so that the amount thereof will be minimized, and stores the compressed bit-map data in a storage means thereby increasing the amount of bit-map data that are storable in the storage means, so that the time required before the characters are outputted can be shortened.

To achieve the above and other objects, there is provided a character output device for use in combination with an external device connected to the character output device for inputting a character code to the character output device, wherein the character output device outputs character data upon converting outline data corresponding to the character code into bit-map data, the bit-map data having an amount of data, the image data output device comprising (a) first storage means, (b) data compressing means for compressing the bit-map data to produce compressed data corresponding to the bit map data, the compressed data having an amount of data, and (c) selecting means for selecting one of the bit-map data and the corresponding compressed data whichever it is lesser in amount of data, and for storing the selected data in the first storage means together with the corresponding character code.

In one embodiment of the present invention, the selecting means comprises comparison means for comparing the amount of the bit-map data with the amount of the corresponding compressed data produced by the data compressing means to determine the lesser amount of data.

With the character output device thus arranged, the bit-map data is compressed by the data compressing means to produce the compressed data, and then the amount of the bit-map data is compared with the amount of the thus compressed data. If the comparison result indicates that the bit-map data is lesser in the amount of data than the compressed data, then the bit-map data is stored in the storage means, whereas if the comparison result indicates that the compressed data is lesser in the amount of data than the bit-map data, the compressed data is stored in the storage means. When storing the data in the storage means, also stored is an identification code indicative of whether the data stored in the storage means is the bit-map data or the compressed data.

In another embodiment of the present invention, the selecting means comprises predicting means for predicting that the amount of the bit-map data is reduced if the bit-map data is compressed by the data compressing means. The selecting means comprises comparison means for comparing the amount of the bit-map data with a predetermined value and providing a comparison result, wherein the selecting means selects the bit-map data when the comparison result indicates that the amount of the bit-map data is smaller than the predetermined value and stores the bit-map data in the first storage means, and wherein the selecting means selects the compressed data when the comparison result indicates that the amount of the bit-map data is larger than the predetermined value and stores the compressed data upon compressing the bit-map data with the data compressing means.

To store the bit-map data produced from the outline data into the storage means for reuse, the amount of the bit-map data is compared with the predetermined value. If the amount of the bit-map data is larger than the predetermined value, it is presumed that the amount of the bit-map data is smaller than the amount of the corresponding compressed data. On the other hand, if the amount of the bit-map data is smaller than the predetermined value, it is presumed that the amount of the compressed data is smaller than the amount of the corresponding bit-map data. Based on such presumptions, either of the bit-map data or the compressed data are stored in the storage means. Therefore, the memory area used to store the data can effectively be reduced.

The above and other objects, features and advantages of the present invention will become more apparent from the following description when taken in conjunction with the accompanying drawings in which preferred embodiments of the present invention are shown by way of illustrative examples.

BRIEF DESCRIPTION OF THE DRAWINGS

FIG. 4(a) is a diagram showing bit-map data of a smaller-size letter "H";

FIG. 4(b) is a diagram showing data compressed from the bit-map data of the smaller-size letter "H" according to the run length process;

FIG. 5(a) is a diagram showing bit-map data of a larger-size letter "H";

FIG. 5(b) is a diagram showing data compressed from the bit-map data of the larger-size letter "H" according to the run length process;

DETAILED DESCRIPTION OF THE PREFERRED EMBODIMENTS

A first embodiment of the present invention will hereinafter be described with reference to FIGS. 1 through 5.

Figure 1:
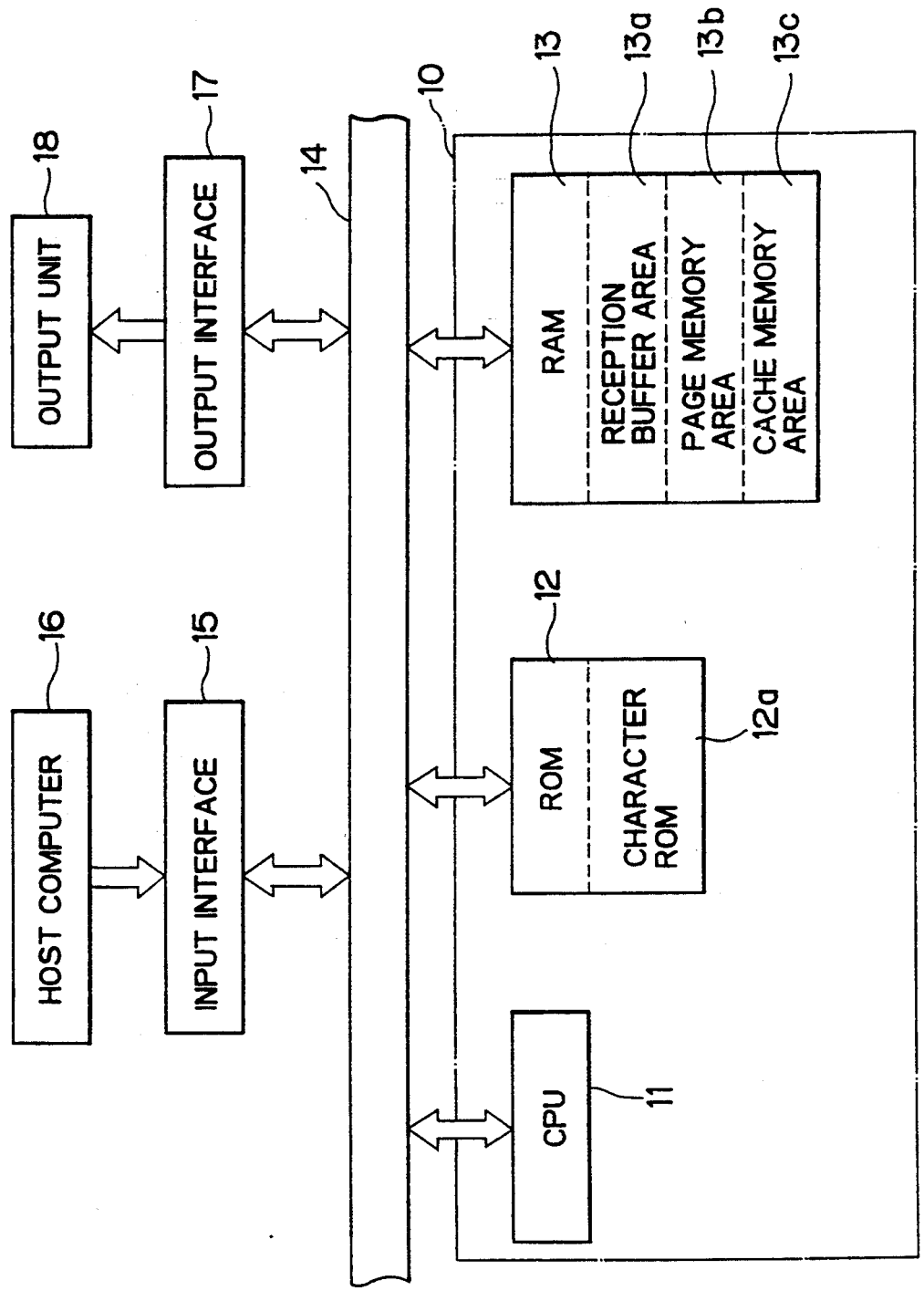
FIG. 1 is a block diagram of an electric arrangement of a character output device according to a first embodiment of the present invention.

FIG. 1 is a block diagram showing an electric arrangement of a character output device according to the present invention. The character output device is controlled in its entirety by a controller 10 comprising a CPU 11, a ROM 12, a RAM 13 which are connected to a bus 14. To the bus 14, there are also connected a host computer 16 through an input interface 15 and an output unit 18 through an output interface 17. The host computer 16, which is an external device, outputs character data composed of character codes indicative of characters including letters, symbols, etc., and size data indicative of the sizes of the characters, and also various control data to the character output device. The output unit 18 comprises a printer, a display unit, or the like, and prints or displays characters corresponding to applied character data on a print sheet or a display screen, based on the data outputted from the controller 10.

Figure 2A:
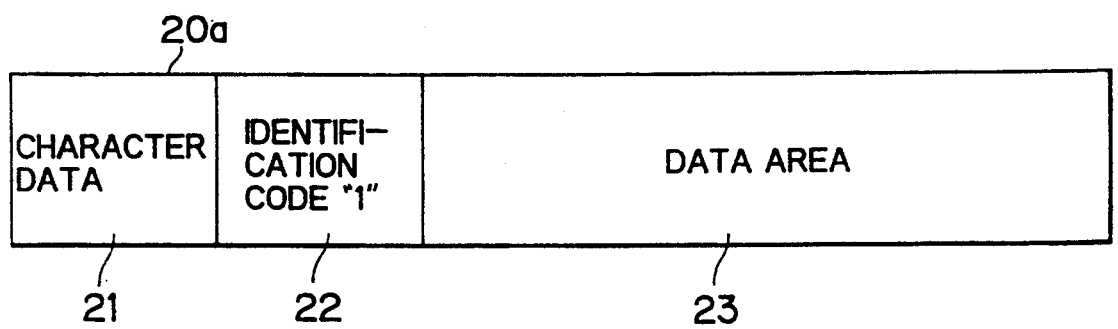
FIGS. 2(a) and 2(b) are diagrams showing a format of font data.
Figure 2B:
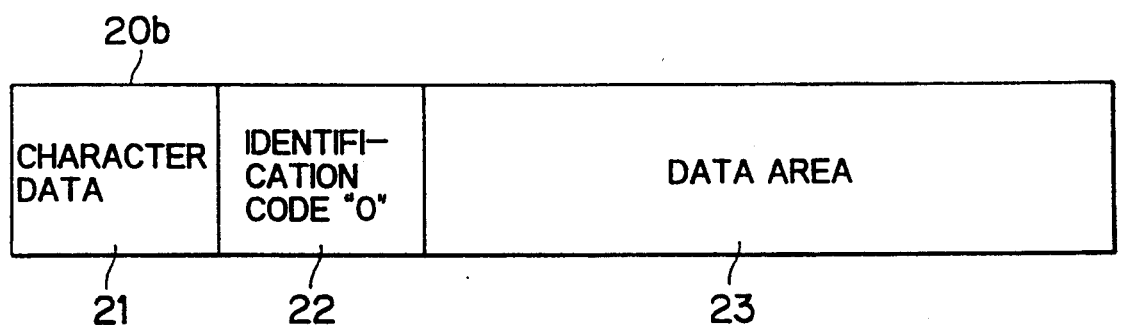
Figure 3:
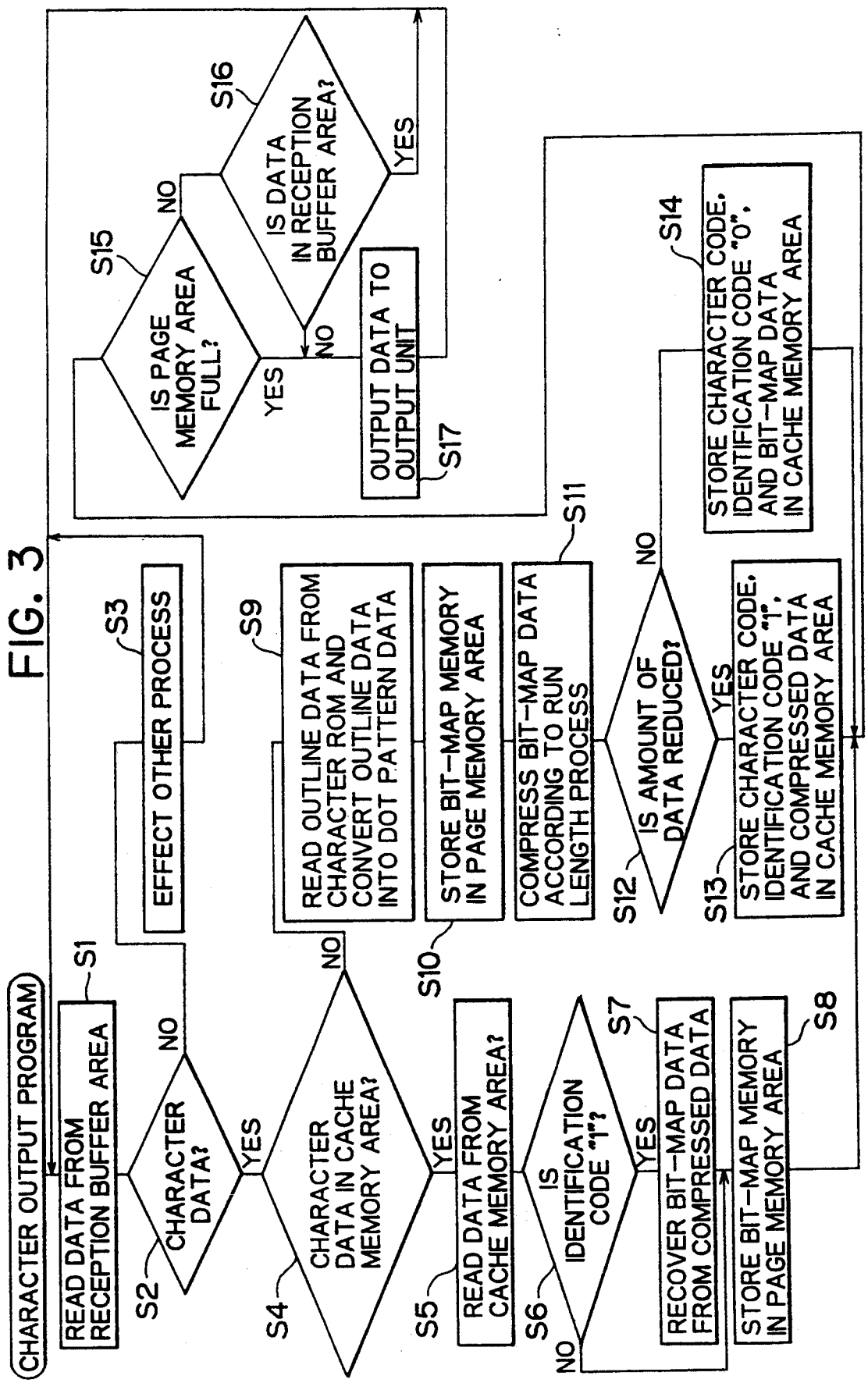
FIG. 3 is a flow chart for description of an operation sequence of a controller.

The CPU 11 serves to control the character output device as a whole. The ROM 12 stores a character output program as shown in FIG. 3, a program for compressing data according to the run length process described later on, a program for recovering the compressed data, and various programs for controlling the character output device. The ROM 12 includes a character ROM 12a which stores outline data representative of the basic outlines of respective characters in the form of vectors. The RAM 13 temporarily stores data supplied from the host computer 16 and data required when the programs are executed. The RAM 13 includes a reception buffer area 13a for storing the data supplied from the host computer 16, a page memory area 13b for storing one page of bit-map data, and a cache memory area 13c for storing font data 20. As shown in FIGS. 2(a) and 2(b), the font data 20 stored in the cache memory area 13c are composed of character data 21, data stored in a data area 23, and an identification code 22 for determining whether the data stored in the data area 23 is data compressed according to the run length process or bit-map data which is not compressed. When the data stored in the data area 23 is compressed data, the identification code 22 is "1" as shown in FIG. 2(a), and when the data stored in the data area 23 is bit-map data, the identification code 22 is "0" as shown in FIG. 2(b). The cache memory area 13c is of an FIFO (First In - First Out) configuration.

The data compressed according to the run length process comprises data R1 indicating how many sets of dots along vertical rows there are in a dot pattern, data R2 indicating how many sets of dots along horizontal lines there are in the dot pattern, and data R3 indicating the starting position of the dot sets along the vertical rows and the number of dots representing the horizontal width of the dot sets along the vertical rows. For example, it is assumed that the data of a dot pattern indicating a letter "H" of a smaller size, as shown in FIG. 4(a), is compressed according to the run length process. Since a first region of the dot pattern extending from the 0th line to the 2nd line contains two dot sets, each one dot wide and three dots long, along the 0th and 4th rows, the data R1, R2, R3 of the compressed data in the first region represent "2", "3", and "0 (starting position), 1 (number of dots representing width), 4 (starting position), 1 (number of dots representing width)", respectively. A second region of the dot pattern, which lies at the 3rd line, contains one set of dots, five dots wide and one dot long, along the 3rd line. The data R1, R2, R3 of the compressed data in the second region, therefore, represent "1", "1", and "0, 5". Inasmuch as a third region of the dot pattern extending from the 4th line to the 6th line contains two dot sets, each one dot wide and three dots long, along the 0th and 4th rows, the data R1, R2, R3 of the compressed data in the third region represent "2", "3", and "0, 1, 4, 1", respectively. Therefore, the compressed data of the dot pattern of the letter "H" shown in FIG. 4(a) are indicated as shown in FIG. 4(b). It is also assumed that the data of a dot pattern indicating a letter "H" of a larger size, as shown in FIG. 5(a), is compressed according to the run length process. A first region of the dot pattern extending from the 0th line to the 8th line contains two dot sets, each three dots wide and nine dots long, along the 0th through 2nd rows and also 11th through 13th rows, and the data R1, R2, R3 of the compressed data in the first region represent "2", "9", and "0, 3, 11, 3", respectively. Since a second region of the dot pattern, which lies at the 9th thorugh 11th lines, contains one set of dots, fourteen dots wide and three dots long, along the 9th through 11th lines, the data R1, R2, R3 of the compressed data in the second region represent "1", "1", and "0, 14". A third region of the dot pattern extending from the 12th line to the 19th line contains two dot sets, each three dots wide and nine dots long, along the 0th through 2nd rows and also the 11th through 13th rows, and hence the data R1, R2, R3 of the compressed data in the third region represent "2", "8", and "0, 3, 11, 3", respectively. Therefore, the compressed data of the dot pattern of the letter "H" shown in FIG. 5(a) are indicated as shown in FIG. 5(b).

Operation of the character output device will be described below with reference to the flow chart of FIG. 3.

Character data and various control data outputted from the host computer 16 are inputted to the character output device through the input interface 15, and successively stored in the reception buffer area 13a of the RAM 13. When the data stored in the reception buffer area 13a exceed a predetermined amount, the CPU 11 executes the character output program shown in FIG. 3. Denoted at Si (i=1, 2, 3, ...) in FIG. 3 represent the number of a step.

First, the CPU 11 reads stored data from the reception buffer area 13a in a step S1, and then determines whether the read data is character data or not in a step S2. If the read data is various control data other than character data (S2: NO), then the CPU 11 effects a process according to the control data in a step S3, and thereafter reads next data from the reception buffer area 13a in the step S1. If the read data is character data (S2: YES), then the CPU 11 determines whether the character data is stored in the cache memory area 13c or not in a step S4. If font data 20 including the character data is stored in the cache memory area 13c (S4: YES), then the font data 20 corresponding to the character code in the character data is read from the cache memory area 13c in a step S5. A step S6 then determines whether the identification code 22 of the read font data 20 is of "1" or not. If the identification code 22 of the read font data 20 is of "1" (S6: YES), then since the data stored in the data area 23 is compressed data, the compressed data is decompressed back into original bit-map data in a step S7. The bit-map data is then stored in the page memory area 13b in a step S8. If the identification code 22 of the read font data 20 is of "0" (S6: NO), then since the data stored in the data area 23 is bit-map data, the bit-map data is stored in the page memory area 13b in the step S8.

If the character data read from the reception buffer area 13a is not stored in the cache memory area 13c (S4: NO), then outline data corresponding to the character code in the character data is read out of the character ROM 12a, and converted into bit-map data of the size that is indicated by the size data in the character data in a step S9. The process of converting the outline data into the bit-map data is disclosed in Japanese Laid-Open Patent Publication No. 2-116565, and will not be described in detail.

The converted bit-map data is stored in the page memory area 13b in a step S10, and then compressed according to the run length process in a step S11. The amount of the bit-map data before it is compressed, and the amount of the compressed bit-map data are compared with each other in a step S12. If the amount of the compressed bit-map data is smaller than the amount of the uncompressed bit-map data (S12: YES), then font data 20a (FIG. 2(a)) is generated which is composed of the character data 21, an identification code 22 of "1", and the compressed data in the data area 23, and stored in the cache memory area 13c in a step S13. If the amount of the compressed bit-map data is greater than the amount of the uncompressed bit-map data (S12: NO), then font data 20b (FIG. 2(b)) is generated which is composed of the character data 21, an identification code 22 of "0", and the bit-map data in the data area 23, and stored in the cache memory area 13c in a step S14.

For example, the amount of bit-map data representing the smaller letter "H" shown in FIG. 4(a) is 35 bits as one dot is indicated by one bit. The amount of data compressed according to the run length process and representing the same smaller letter "H" is 128 bits because each data item is 8 bits as shown in FIG. 4(b). Therefore, with respect to the smaller letter "H", the CPU 11 decides that the amount of the compressed bit-map data is greater than the amount of the uncompressed bit-map data in the step S12. Therefore, the identification code 22 of the font data 20 for the smaller letter "H" is of "0", and the bit-map data is stored in the data area 23. The amount of bit-map data representing the larger letter "H" shown in FIG. 5(a) is 280 bits. The amount of data compressed according to the run length process and representing the same larger letter "H" is 128 bits as shown in FIG. 5(B). Therefore, with respect to the larger letter "H", the CPU 11 decides that the amount of the compressed bit-map data is smaller than the amount of the uncompressed bit-map data in the step S12. Therefore, the identification code 22 of the font data 20 for the larger letter "H" is of "1", and the compressed data is stored in the data area 23.

When the steps S13, S14 are executed, if the cache memory area 13c already stores font data 20 up to its storage capacity and cannot store new font data 20, then the initially stored font data 20 is erased from the cache memory area 13c, and the new font data 20 is stored in the cache memory area 13c.

After the steps S8, S13, S14, the CPU 11 determines whether one page of bit-map data is stored in the page memory area 13b in a step S15. If bit-map data short of one page is stored in the page memory area 13b (S15: NO), then the CPU 11 determines whether there is data stored in the reception buffer area 13a in a step S16. If there is data stored in the reception buffer area 13a, then the CPU 11 executes the step S1 again. If one page of bit-map data is stored in the page memory area (S15: YES), or if bit-map data short of one page is stored in the page memory area 13b (S15: NO) and also if there is no data stored in the reception buffer area 13a (S16: NO), then the bit-map data stored in the page memory area 13b is outputted to the output unit 18 through the output interface 17 in a step S16. Thereafter, the step S1 is executed again. The output unit 18 prints characters on a print sheet or displays a character on a display screen, based on the outputted bit-map data. In the character output device according to the present invention, as described above, font data 20 relative to bit-map data corresponding to inputted character data is stored in the cache memory area 13c, and when the same character data is inputted again, the corresponding font data 20 is read out of the cache memory area 13c, and bit-map data is restored from the font data 20 and outputted to the output unit. Therefore, the time required until the characters are outputted can be shortened. For storing the font data into the cache memory area 13c, if the amount of the bit-map data corresponding to the character data is reduced upon compression according to the run length process, then font data 20(a) including the compresseed data is stored in the cache memory area 13c, and if the amount of the bit-map data corresponding to the character data is not reduced upon compression according to the run length process, then font data 20(b) including the bit-map data is stored in the cache memory area 13c. Therefore, the amount of bit-map data that can be stored can be increased, making it possible to further reduce the time required before the characters are outputted.

A second embodiment of the present invention will next be described in which character data are outputted to a printing device for printing.

Figure 6:
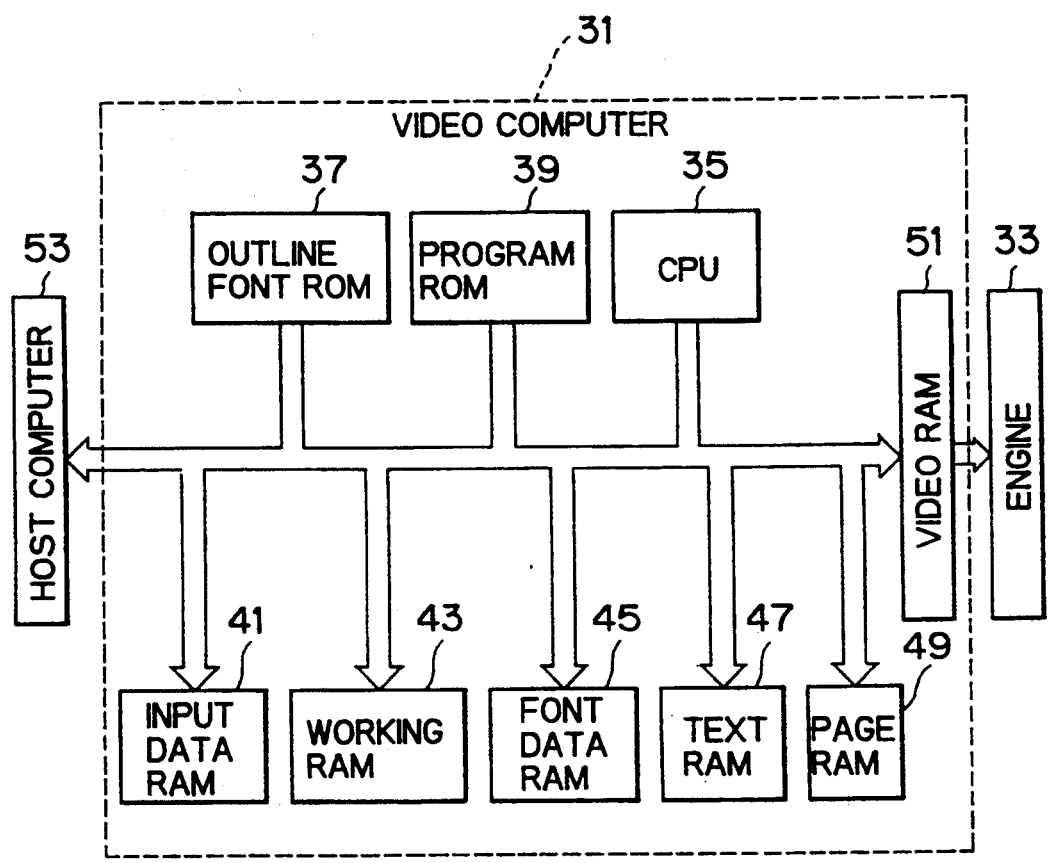
FIG. 6 is a block diagram showing a control circuit of a printing device according to a second embodiment of the present invention.

FIG. 6 is a block diagram showing a control circuit for the printing device. The control circuit includes a video controller 31. The video controller 31 serves to output a video signal, which is generated based on input data from a host computer 53, to an engine 33. The video controller 31 comprises a CPU 35, an outline font ROM 37, a program ROM 39, an input data RAM 41, a working RAM 43, a font data RAM 45, a text RAM 47, a page RAM 49, and a video RAM 51, which are connected to each other through a bus.

Figure 8:
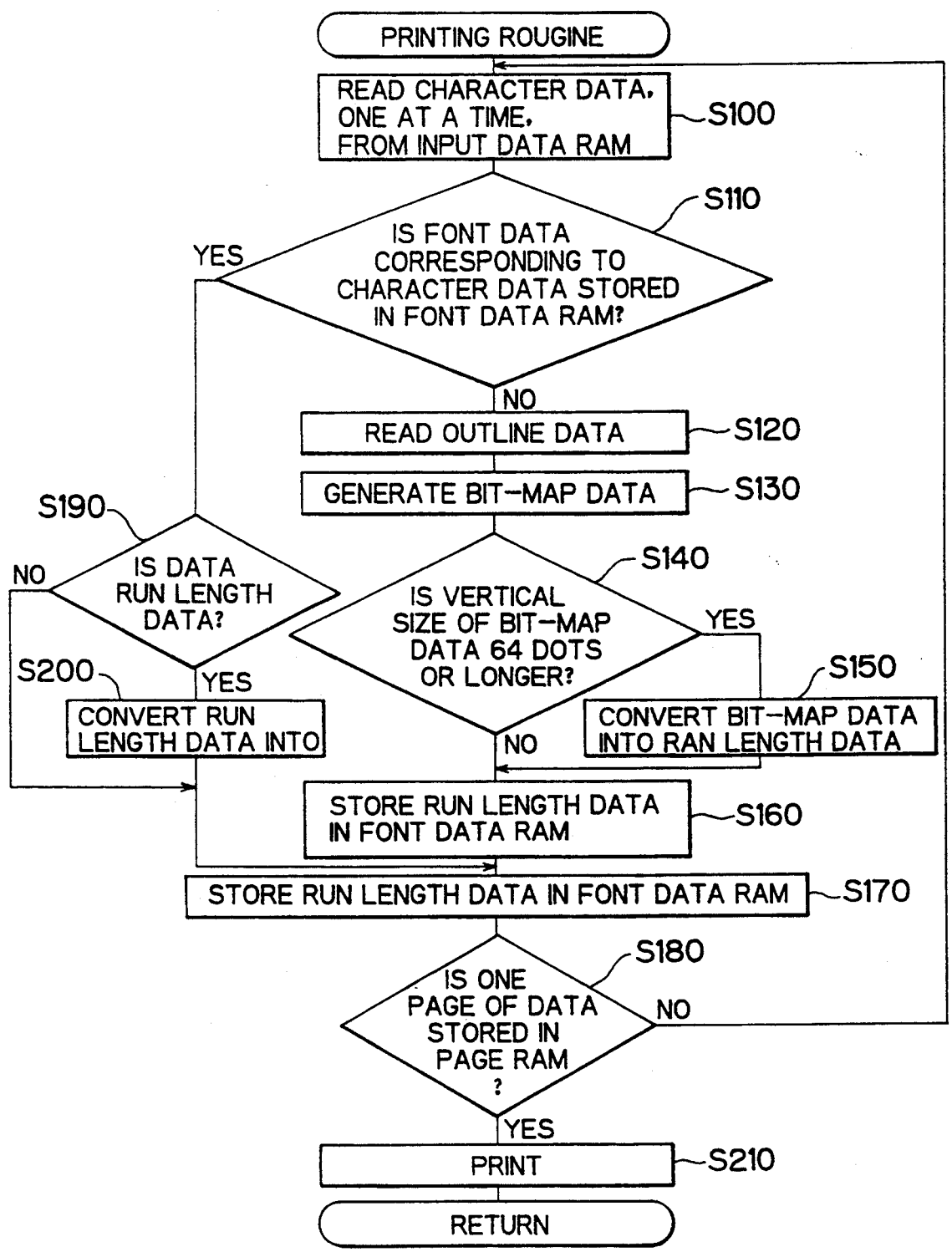
FIG. 8 is a flow chart for description of an operation process executed by a CPU of the control circuit.

The outline font ROM 37 stores outline data representing the outlines of characters including alphabetical letters, symbols, etc. The program ROM 39 stores various programs including a program for converting outline data into bit-map data, a printing routine (see FIG. 8), etc. The input data RAM 41 stores character data (indicative of character data, character codes, character styles) inputted from the host computer 53 and various command data. The working RAM 43 temporarily stores calculation data required when the program for converting outline data into bit-map data and other programs are executed. The font data RAM 45 stores bit-map data that has been generated from outline data. The text RAM 47 stores, one page at a time, addresses of the bit-map data stored in the font data RAM 45 and position data indicating print positions of the bit-map data within one page. The page RAM 49 stores the bit-map data for an entire page. The video RAM 51 successively stores the data from the page RAM 49, one-seventh of a page at a time, and outputs the stored data as a serial video signal to the engine 33. The engine 33 turns on and off a laser beam according to the video signal from the video RAM 51 for printing.

Figure 7:
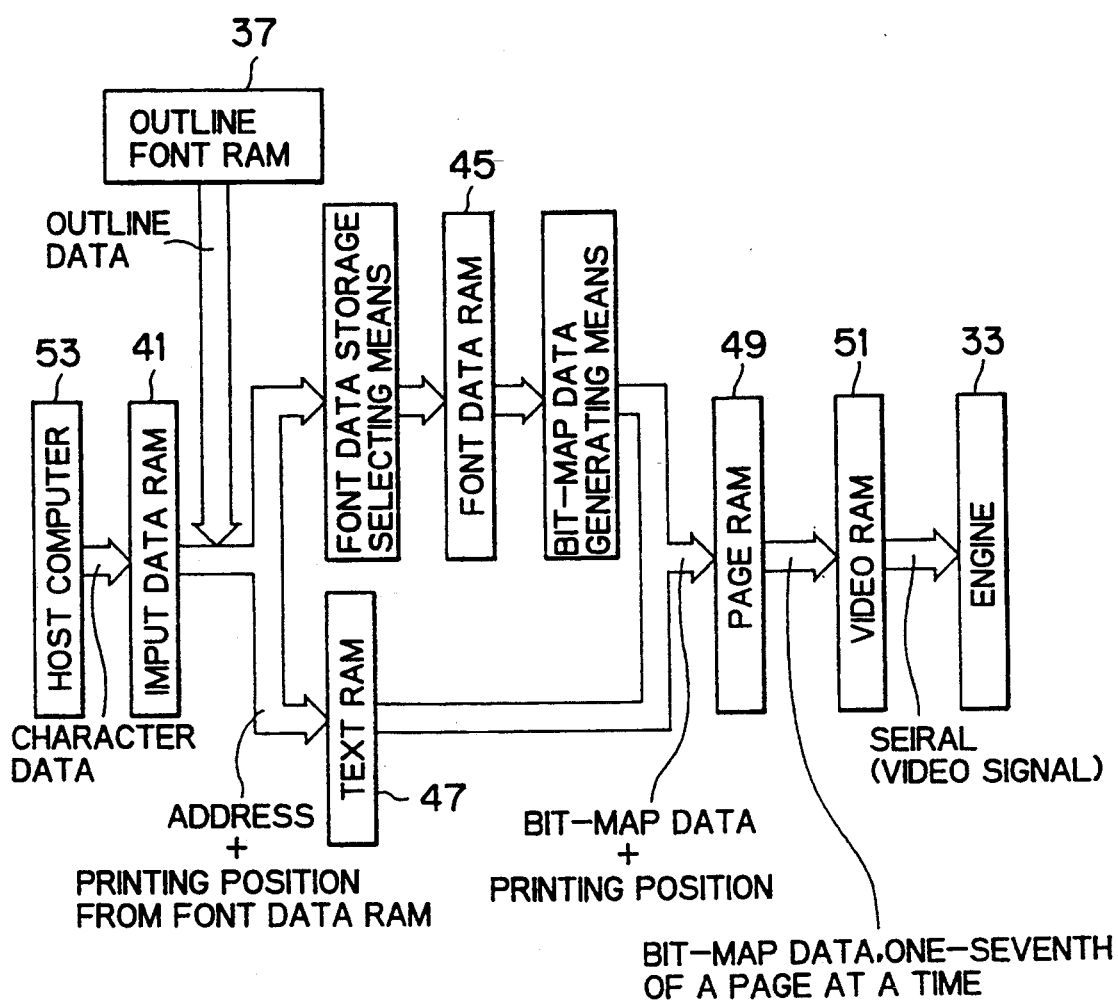
FIG. 7 is a block diagram showing an overall processing sequence of the printing device.

Printing operation of the printing device will briefly be described below with reference to FIG. 7.

The host computer 53 successively inputs character data composed of character codes, character sizes, and character styles. The supplied character data are temporarily stored in the input data RAM 41. When one page of character data is stored in the input data RAM 41, the character data are read from the input data RAM 41, one character at a time. Outline data corresponding to the read character data is read from the outline data ROM 37. The read outline data is processed into bit-map data whose size is indicated by the character data.

The generated bit-map data is stored in the font data RAM 45 for reuse. At this time, either bit-map data or run length data that is stored in a less memory area is selected by a font data storage selecting means which is implemented by the execution of a printing routine (FIG. 8) that will be described later on.

At the same time, the addresses of the bit-map data stored in the font data RAM 45 and position data indicating print positions of the bit-map data within one page are successively stored in the text RAM 47 while being edited, one page at a time. The addresses and print position data stored in the text RAM 47, and the previously generated bit-map data are combined into bit-map data for an entire page, which are successively stored in the page RAM 49.

The above operation is repeated until one page of bit-map data is stored in the page RAM 49, whereupon the stored bit-map data is transferred to the video RAM 51, one-seventh of a page at a time. Then, a serial video signal is outputted, one bit at a time, from the video RAM 51 to the engine 33. The transfer of the bit-map data for one-seventh of a page to the video RAM 51 is repeated seven times, for printing one page of data.

The printing routine (FIG. 8) to be executed by the CPU 35 of the video controller 31 will be described below. The printing routine is started each time one page of character data from the host computer 53 is stored in the input data RAM 41.

After starting the printing routine, the CPU 35 reads character data, one at a time, from the input data RAM 41 in a step S100. Then, the CPU 35 determines whether font data corresponding to the read character data is already stored in the font data RAM 45 in a step S110. If not, then the CPU 35 reads outline data corresponding to the character data from the outline font ROM 37 in a step S120. The CPU 35 processes the outline data to generate bit-map data at a size indicated by the character data in a step S130.

Thereafter, the CPU 35 determines whether or not the vertical size of the generated bit-map data is 64 dots or more long in a step S140. If the vertical size is 64 dots or more long, then the CPU 35 converts the generated bit-map data into run length data in a step S150. The converted run length data and the character data are stored in the font data RAM 45 for reuse in a step S160. If the vertical size is less than 64 dots long in the step S140, then the CPU 35 stores the bit-map data and the character data in the font data RAM 45 in the step S160.

Then, the CPU 35 stores the bit-map data, generated in the step S130, in the page RAM 49 in relation to printing positions in a step S170. The CPU 35 determines whether one page of data has been stored in the page RAM 49 in a step S180. If not, then the above process is repeated.

While the above process is being repeated, bit-map data corresponding to the character data read from the input data RAM 41 may have already been stored in the font data RAM 45 for reuse. If such bit-map data is actually stored in the font data RAM 45 in the step S110, then the CPU 35 determines whether the stored data is bit-map data or run length data in a step S190. If the stored data is run length data, then the run length data is converted into bit-map data in a step S200. If the stored data is bit-map data in the step S190, then the CPU 35 skips the step S200, and stores the bit-map data into the page RAM 49 in relation to printing positions in the step S170.

The bit-map data are successively stored in the page RAM 49 until one page of bit-map data is stored in the page RAM 49 in the step S180. Then, the CPU 35 executes a printing process in a step S210. In the printing process, one page of bit-map data stored in the page RAM 49 is transferred to the video RAM 51, one-seventh of a page at a time. The video RAM 51 outputs a serial video signal, one bit at a time, to the engine 33, which prints the data on one page. After the printing process in the step S210, the printing routine is finished. Each time a new page of data is stored in the input data RAM 41, the printing routine is initiated to repeat the aforesaid process.

In the printing device of the above embodiment, as described above, when character bit-map data generated from the corresponding outline data is to be stored in the font data RAM 45 for reuse, the bit-map data is converted into run length data for storage if the vertical size of the bit-map data is 64 dots or more long, and the bit-map data is stored as it is if the vertical size of the bit-map data is less than 64 dots long.

Figure 9:
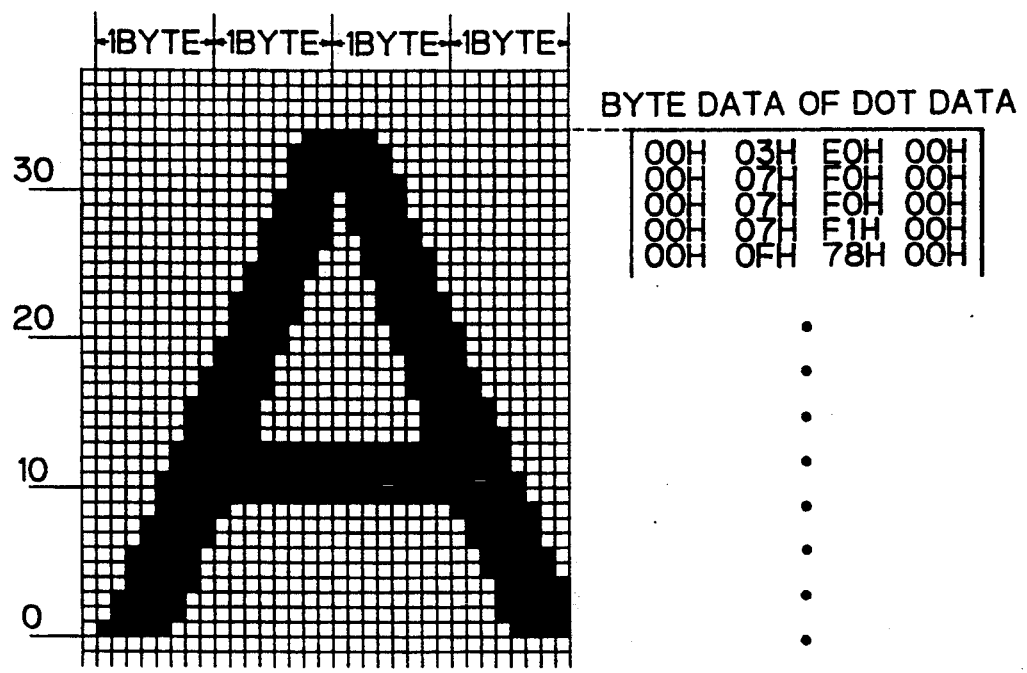
FIG. 9 is a diagram showing the manner in which data is stored in a bit-map format in a font data RAM.
Figure 10:
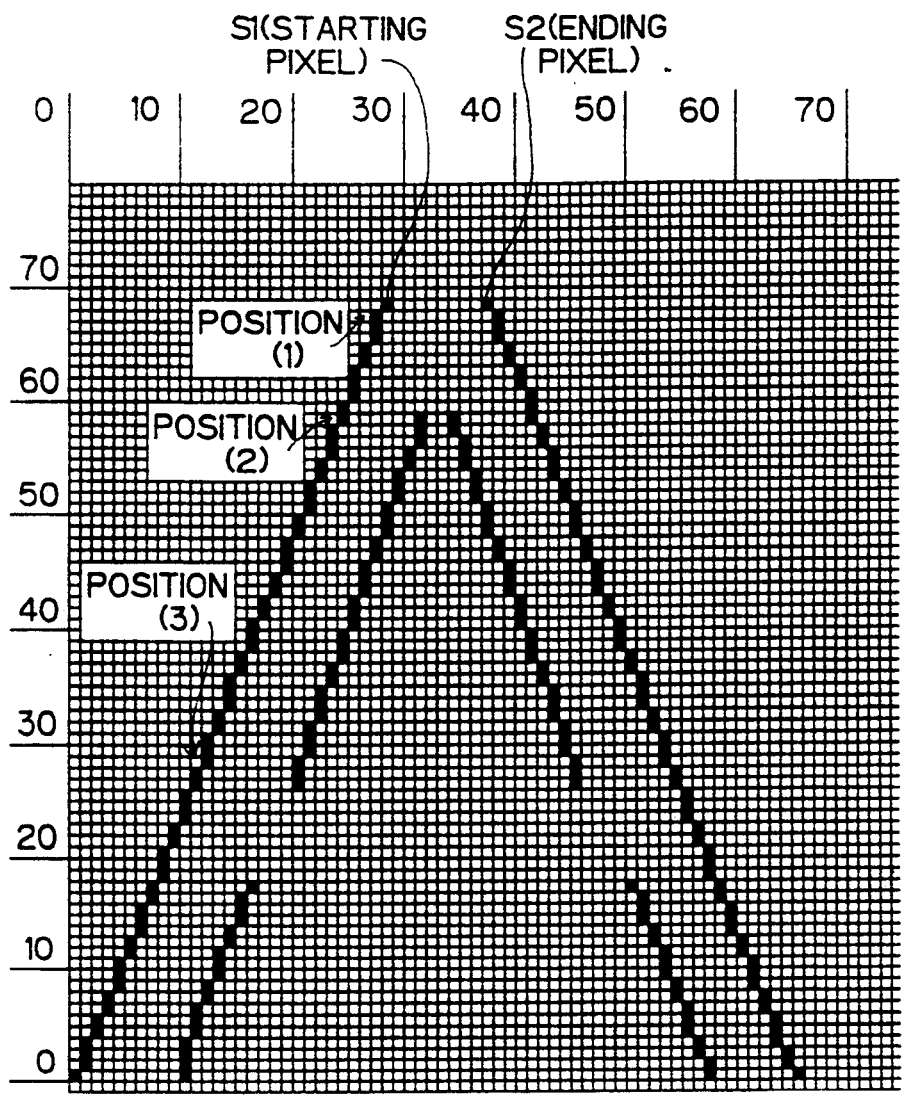
FIG. 10 is a diagram showing the manner in which data is stored in a run length format in the font data RAM.

FIG. 9 shows bit-map data, and FIG. 10 shows run length data. The bit-map data comprises byte data indicating "black (printed dot)" with "1" and "white" with "0" for each of pixels. The run length data comprises data indicating the positions of starting and ending pixels of those pixels which are to be successively printed, and the total number of the starting and ending pixels. For example, the run length data of a line beginning at a position (1) in FIG. 10 is represented by "2, 29, 38", the run length data of a line beginning at a position (2) by "4, 25, 32, 35, 42", and the run length data of a line beginning at a position (3) by "4, 12, 21, 46, 55".

The bit-map data of the letter "A" shown in FIG. 10, whose vertical size is more than 64 dots longer, is of 690 bytes, and the run length data thereof is of a sightly smaller value of 618 bytes. The bit-map data of a 1,000-point letter "H" is of 840 kilobytes, and the run length data thereof is of 28 kilobytes, a value which is compressed to 1/30 of the bit-map data.

With respect to characters (alphabetic letters), it is substantially correct to say that if the vertical size of the bit-map data is less than 64 dots long, then the bit-map data is smaller in data size than the compressed run length data, and if the vertical size of the bit-map data is 64 dots or more long, then the compressed run length data is smaller in data size than the bit-map data. As the vertical size of the bit-map data increases, the data size of the bit-map data greatly increases, and the compression ratio of the run length data increases. Therefore, when either the bit-map format or the run length format is selected depending on whether the vertical size of the bit-map data is less than 64 dots long or 64 dots or more long, and the bit-map data is stored in the font data RAM 15 using the selected data format, the memory area of the font data RAM 15 used to store the data can be reduced.

With the printing device in the above embodiment, since the data format used to store the bit-map data in the font data RAM 45 is selected depending on whether the vertical size of the bit-map data is less than 64 dots long or 64 dots or more long, and the bit-map data is stored in the font data RAM 45 using the selected format for a smaller data size, the memory area for storing the data can be reduced adequately.

Although a certain preferred embodiment of the present invention has been shown and described in detail, it should be understood that the present invention is not limited to the illustrated embodiments, but various changes and modifications may be made therein without departing from the scope of the present invention. For example, various known methods, e.g., TIFF (Tagged Imaged File Format), other than the run length process may be employed to compress character bit-map data. The compression method and the reference data size may be individually selected depending on the kinds of characters, e.g., alphabetical letters, numerals, Hiragana characters, Katakana characters, Chinese characters, etc. Further, the present invention is also applicable to the case of outputting an image block in lieu of the character if outline data regarding the image block is stored in the memory in connection with a code assigned to each image block.

According to the first embodiment of the present invention, bit-map data is compressed so that the amount thereof is minimized, and the compressed data is stored in the memory means. Therefore, the amount of bit-map data that can be stored can be increased to reduce the time before the characters are outputted.

According to the second embodiment of the present invention, if the size of bit-map data is small, it is stored in a memory as it is, and if the size of bit-map data is large, it is compressed and stored in a memory. Consequently, the memory area used to store the data can be reduced.

What is claimed is:

1. A character output device for use in combination with an external device connected to the character output device for inputting a character code to the character output device, wherein the character output device outputs character data upon converting outline data corresponding to the character code into bit-map data, the bit-map data having an amount of data, the character output device comprising:

first storage means;
   data compressing means for compressing the bit-map data of a character to produce compressed data corresponding to the bit map data, the compressed data having an amount of data; and
   selecting means for selecting one of the bit-map data and the corresponding compressed data whichever has lesser in amount of data, and for storing the selected data in said first storage means together with the corresponding character code.

2. The character output device according to claim 1, wherein said selecting means comprises comparison means for comparing the amount of the bit-map data with the amount of the corresponding compressed data produced by said data compressing means to determine the lesser amount of data.

3. The character output device according to claim 2, wherein said selecting means further stores an identification code indicative of whether the selected data is the bit-map data or the compressed data in connection with the selected data and the corresponding character code.

4. The character output device according to claim 3, further comprising data recovering means for recovering the bit-map data from the compressed data in response to the identification code indicative of the compressed data.

5. The character output device according to claim 4, further comprising second storage means for storing outline data corresponding to the character code, the outline data defining an outer profile of a character with vectors, wherein the external device further inputs to the character output device size data indicative of a size of a character in connection with the character code, and wherein the outline data is converted to the bit-map data in accordance with the character code and the size data.

6. The character output device according to claim 5, further comprising outputting means for outputting the character data in response to the character code and the size data inputted from the external device, said outputting means reading data which have been stored in said first storage means when same character code is inputted from the external device.

7. The character output device according to claim 1, wherein said data compressing means compresses the bit-map data according to a run length process.

8. The character output device according to claim 1, wherein said data compressing means compresses the bit-map data according to a tagged imaged file format.

9. The character output device according to claim 1, wherein said first storage means is a first in first out configuration.

10. The character output device according to claim 1, wherein said selecting means comprises comparison means for comparing the amount of the bit-map data with a predetermined value and providing a comparison result, wherein said selecting means selects the bit-map data when the comparison result indicates that the amount of the bit-map data is smaller than the predetermined value and stores the bit-map data in said first storage means, and wherein said selecting means selects the compressed data when the comparison result indicates that the amount of the bit-map data is larger than the predetermined value and stores the compressed data upon compressing the bit-map data with said data compressing means.

11. The character output device according to claim 10, wherein said selecting means further stores an identification code indicative of whether the selected data is the bit-map data or the compressed data in connection with the selected data and the corresponding character code.

12. The character output device according to claim 11, further comprising data recovering means for recovering the bit-map data from the compressed data in response to the identification code indicative of the compressed data.

13. The character output device according to claim 12, further comprising second storage means for storing outline data corresponding to the character code, the outline data defining an outer profile of a character with vectors, wherein the external device further inputs to the character output device size data indicative of a size of a character in connection with the character code, and wherein the outline data is converted to the bit-map data in accordance with the character code and the size data.

14. The character output device according to claim 13, further comprising outputting means for outputting the character data in response to the character code and the size data inputted from the external device, said outputting means reading data which have been stored in said first storage means when same character code is inputted from the external device.

15. A character output device for use in combination with an external device connected to the character output device for inputting a character code to the character output device, wherein the character output device outputs character data upon converting outline data corresponding to the character code into bit-map data, the bit-map data having an amount of data, the character output device comprising:
    first storage means;
    data compressing means for compressing the bit-map data to produce compressed data corresponding to the bit map data, the compressed data having an amount of data;
    predicting means for predicting that the amount of the bit-map data is reduced if the bit-map data is compressed by said data compressing means; and
    selecting means for selecting one of the bit-map data and the corresponding compressed data whichever has lesser in amount of data, and for storing the selected data in said first storage means together with the corresponding character code.

16. The character output device according to claim 15, wherein said selecting means comprises comparison means for comparing the amount of the bit-map data with a predetermined value and providing a comparison result, wherein said selecting means selects the bit-map data when the comparison result indicates that the amount of the bit-map data is smaller than the predetermined value and stores the bit-map data in said first storage means, and wherein said selecting means selects the compressed data when the comparison result indicates that the amount of the bit-map data is larger than the predetermined value and stores the compressed data upon compressing the bit-map data with said data compressing means.

17. The character output device according to claim 16, wherein said selecting means further stores an identification code indicative of whether the selected data is the bit-map data or the compressed data in connection with the selected data and the corresponding character code.

18. The character output device according to claim 17, further comprising data recovering means for recovering the bit-map data from the compressed data in response to the identification code indicative of the compressed data.

19. The character output device according to claim 18, further comprising second storage means for storing outline data corresponding to the character code, the outline data defining an outer profile of a character with vectors, wherein the external device further inputs to the character output device size data indicative of a size of a character in connection with the character code, and wherein the outline data is converted to the bit-map data in accordance with the character code and the size data.

20. The character output device according to claim 19, further comprising outputting means for outputting the character data in response to the character code and the size data inputted from the external device, said outputting means reading data which have been stored in said first storage means when same character code is inputted from the external device.

21. The character output device according to claim 15, wherein said data compressing means compresses the bit-map data according to a run length process.

22. The character output device according to claim 15, wherein said data compressing means compresses the bit-map data according to a tagged imaged file format.

23. The character output device according to claim 15, wherein said first storage means is a first in first out configuration.

24. The character output device according to claim 15, further comprising comparison means for comparing the amount of the bit-map data with a predetermined value, and wherein said data compressing means produces the compressed data when said comparison means indicates that the amount of the bit-map data is larger than the predetermined value.

25. A character output device for use in combination with an external device connected to the character output device for inputting input data to the character output device for inputting input data to the character output device, wherein the character output device outputs character data upon converting outline data into bit-map data in accordance with the input data, the bit-map data having an amount of data, the character output device comprising:
    storage means for storing the bit map data;
    comparison means for comparing the amount of the bit-map data with a predetermined value and providing a comparison result;

bit-map data storing means for storing the bit-map data in said storage means when the comparison result indicates that the amount of the bit-map data is smaller than the predetermined value; and bit-map data compressing/storing means for compressing the bit-map data to produce compressed bit-map data and storing the compressed bit-map data in said storage means when the comparison result indicates that the amount of the bit-map data is larger than the predetermined value.

* * * * *